(12) United States Patent
Van Giesen et al.

(10) Patent No.: US 11,155,997 B2
(45) Date of Patent: Oct. 26, 2021

(54) ROOF FORMING ELEMENT, ROOF, AND METHOD OF MANUFACTURING

(71) Applicant: SABIC GLOBAL TECHNOLOGIES B.V., Bergen Op Zoom (NL)

(72) Inventors: Roland Van Giesen, Geleen (NL); Henrica Norberta Alberta Maria Steenbakkers-Menting, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 280 days.

(21) Appl. No.: 16/474,834

(22) PCT Filed: Dec. 22, 2017

(86) PCT No.: PCT/EP2017/084504
§ 371 (c)(1),
(2) Date: Jun. 28, 2019

(87) PCT Pub. No.: WO2018/122198
PCT Pub. Date: Jul. 5, 2018

(65) Prior Publication Data
US 2020/0002948 A1    Jan. 2, 2020

(30) Foreign Application Priority Data
Jan. 2, 2017   (EP) .................... 17150042

(51) Int. Cl.
*E04D 3/28* (2006.01)
*H02S 20/23* (2014.01)
*E04D 3/32* (2006.01)

(52) U.S. Cl.
CPC ............... *E04D 3/28* (2013.01); *E04D 3/32* (2013.01); *H02S 20/23* (2014.12); *E04D 2003/285* (2013.01)

(58) Field of Classification Search
CPC .... E04D 3/28; E04D 3/24; E04D 3/32; E04D 3/357; E04D 2003/3617; E04D 3/362;
(Continued)

(56) References Cited

U.S. PATENT DOCUMENTS 4,155,206 A * 5/1979 Player ....................... E04D 3/30
52/200
4,299,070 A * 11/1981 Oltmanns ................. E04B 2/72
52/309.11
(Continued)

FOREIGN PATENT DOCUMENTS

AU          561455 B2    5/1987
CN        106105021 A   11/2016
(Continued)

OTHER PUBLICATIONS

International Search Report; International Application No. PCT/EP2017/084504; International Filing Date: Dec. 22, 2017; dated Feb. 16, 2018; 4 pages.
(Continued)

*Primary Examiner* — Adriana Figueroa
(74) *Attorney, Agent, or Firm* — Cantor Colburn LLP

(57) ABSTRACT

Roof forming element, a plurality of which may form a roof of a building, comprising base part comprising an elongate roof plate of a polymer, a cover for covering the roof plate, and coupling means for coupling the roof forming element in use to further, neighbouring roof forming element, the base part comprising an elongate reinforcement part comprising a strip comprising polymer and unidirectional fibers, bonded to the base part at the interior side of the base part and extending in the length direction along the length of the base part, the elongate reinforcement part covering at least a part of the width of the base part, the strip of the elongate reinforcement part having a higher Young's modulus than
(Continued)

US 11,155,997 B2

Page 2 the base part, or at least a part of the base part to which the elongate reinforcement part has been bonded.

23 Claims, 7 Drawing Sheets

(58) Field of Classification Search
CPC ....... E04D 2003/285; E04C 2/20; E04C 2/54; E04C 2/543; E04C 3/28; H02S 20/23
See application file for complete search history.

(56) References Cited

U.S. PATENT DOCUMENTS

| | | | | |
|---|---|---|---|---|
| 4,580,373 A * | 4/1986 | Bastiansen | ................ | E04D 3/35 52/94 |
| 4,930,282 A * | 6/1990 | Meadows | ................ | E04D 1/20 52/551 |
| 5,177,924 A * | 1/1993 | Kakuk | ................ | E04C 2/16 52/606 |
| 5,411,782 A * | 5/1995 | Jarvis | ................ | E04H 4/08 160/229.1 |
| 5,613,339 A * | 3/1997 | Pollock | ................ | B63B 3/48 52/836 |
| 5,636,481 A * | 6/1997 | De Zen | ................ | E04D 3/363 52/95 |
| 5,647,184 A * | 7/1997 | Davis | ................ | C08L 23/10 52/100 |
| 5,657,595 A * | 8/1997 | Fyfe | ................ | E01D 22/00 52/252 |
| 5,758,456 A * | 6/1998 | Case | ................ | E04C 2/20 52/177 |
| RE36,976 E * | 12/2000 | Bezner | ................ | E06B 3/5828 52/563 |
| 7,900,416 B1 * | 3/2011 | Yokubison | ................ | E04F 15/10 52/592.1 |
| 8,056,289 B1 * | 11/2011 | Konstantin | ................ | E04D 3/352 52/204.591 |
| 2003/0056448 A1 * | 3/2003 | Givoni | ................ | E04C 2/543 52/171.3 |
| 2007/0062146 A1 * | 3/2007 | Van Dijk | ................ | E04B 1/86 52/580 |
| 2013/0255172 A1 * | 10/2013 | Rutherford | ................ | E04F 13/06 52/302.1 |
| 2013/0283710 A1 * | 10/2013 | Laurin | ................ | H02S 20/00 52/173.3 |
| 2014/0174008 A1 * | 6/2014 | Konstantin | ................ | E04D 3/35 52/209 |
| 2015/0204476 A1 * | 7/2015 | Lazzara | ................ | F16L 9/128 138/99 |
| 2015/0275051 A1 * | 10/2015 | Downs | ................ | B32B 5/26 428/41.8 |
| 2017/0019061 A1 * | 1/2017 | Van Giesen | ................ | H02S 20/25 |
| 2019/0048962 A1 * | 2/2019 | Wuest | ................ | B29C 70/24 |

FOREIGN PATENT DOCUMENTS

| | | |
|---|---|---|
| EP | 0496690 A1 | 7/1992 |
| WO | 2005085547 A3 | 9/2005 |
| WO | 2006081630 A1 | 8/2006 |
| WO | 2016142784 A1 | 9/2016 |

OTHER PUBLICATIONS

Written Opinion; International Application No. PCT/EP2017/084504; International Filing Date: Dec. 22, 2017; dated Feb. 16, 2018; 5 pages.

* cited by examiner

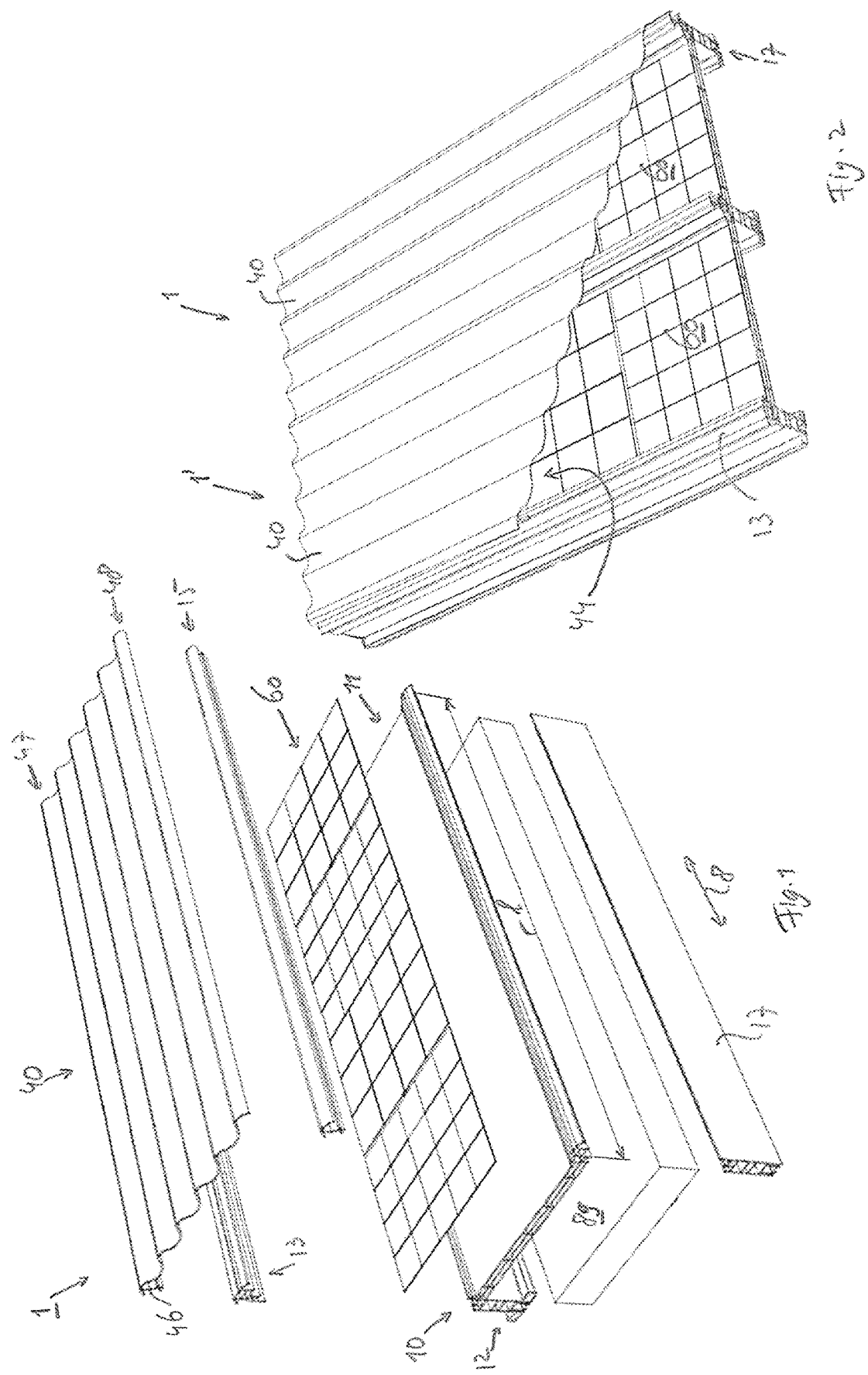

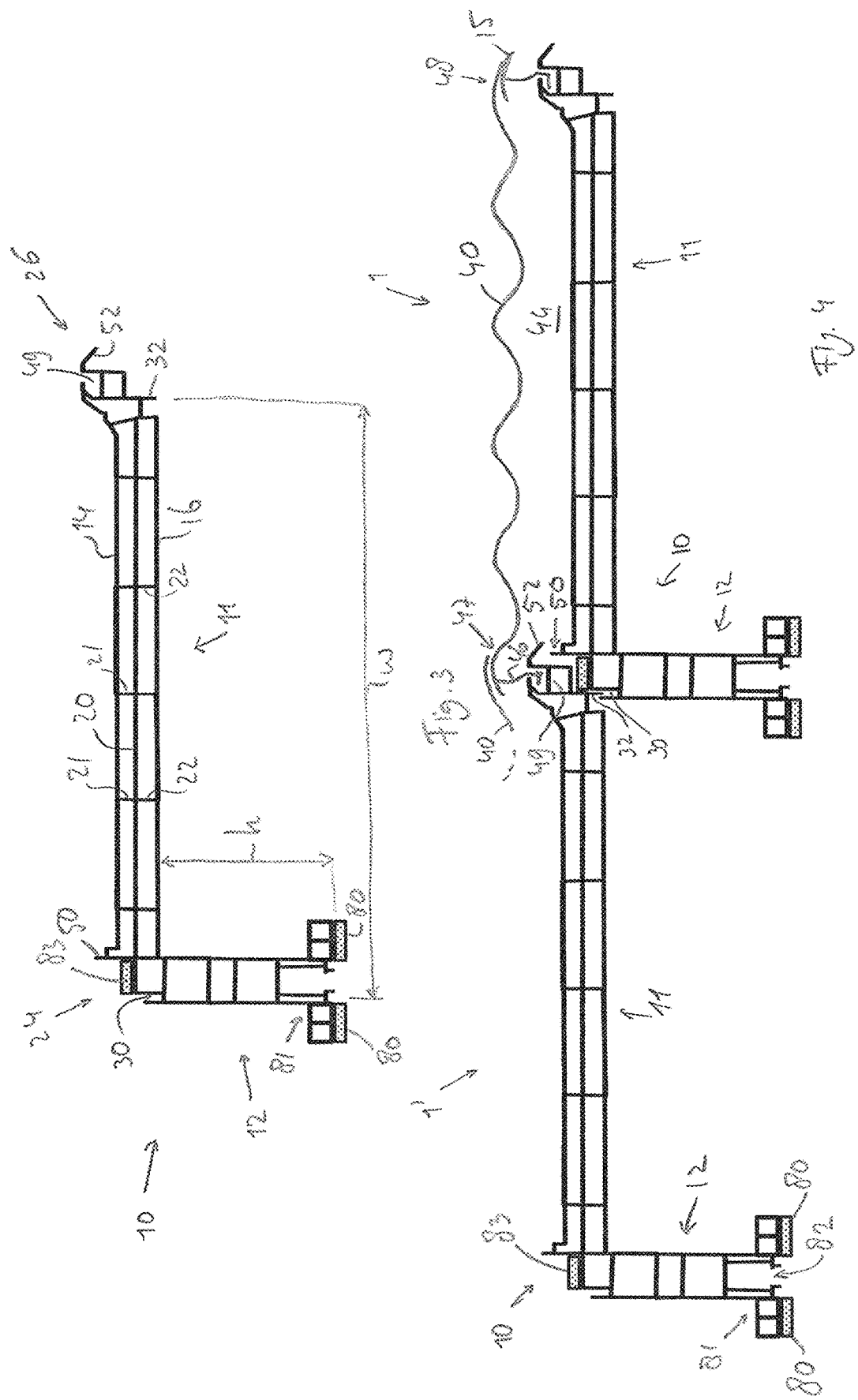

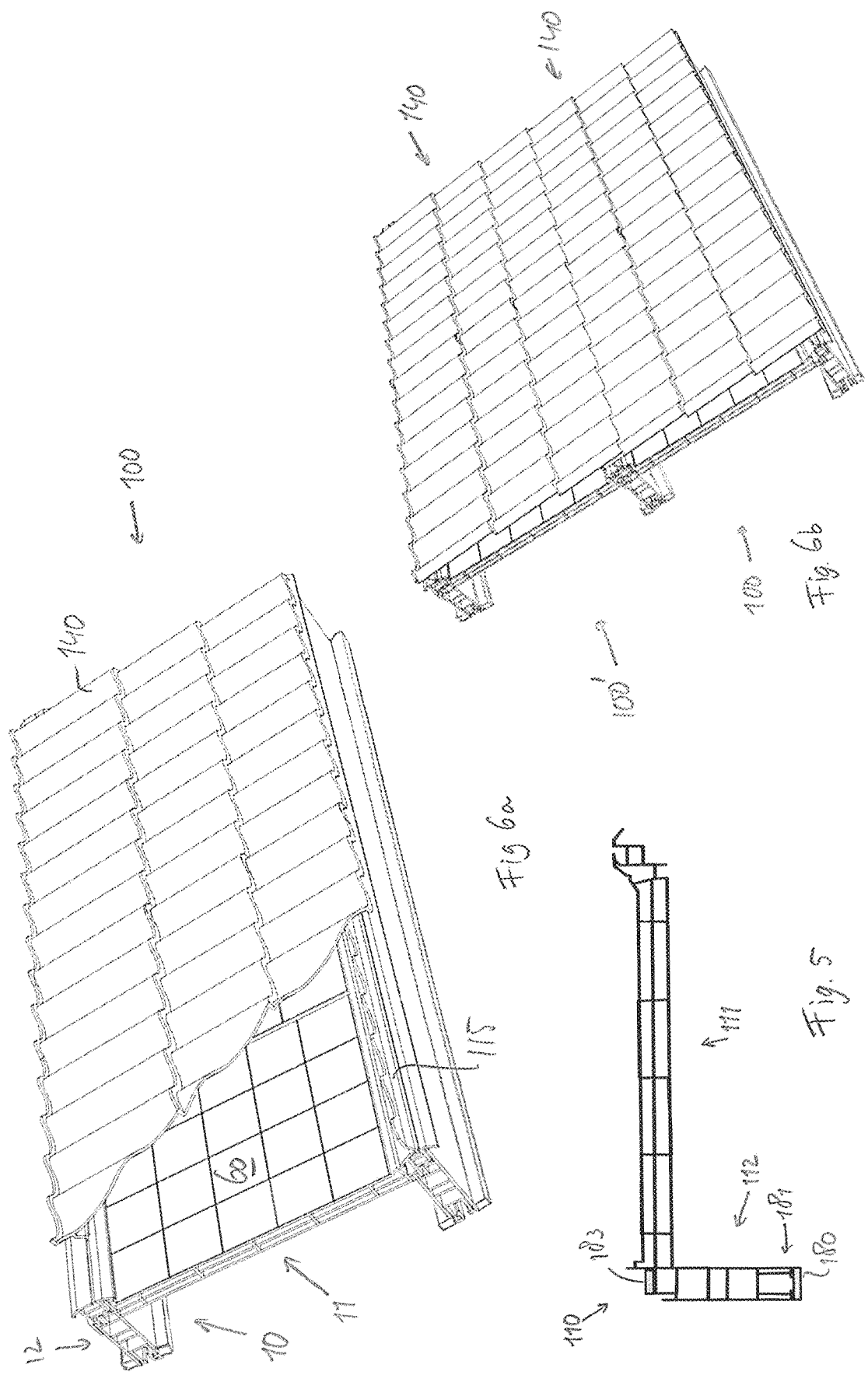

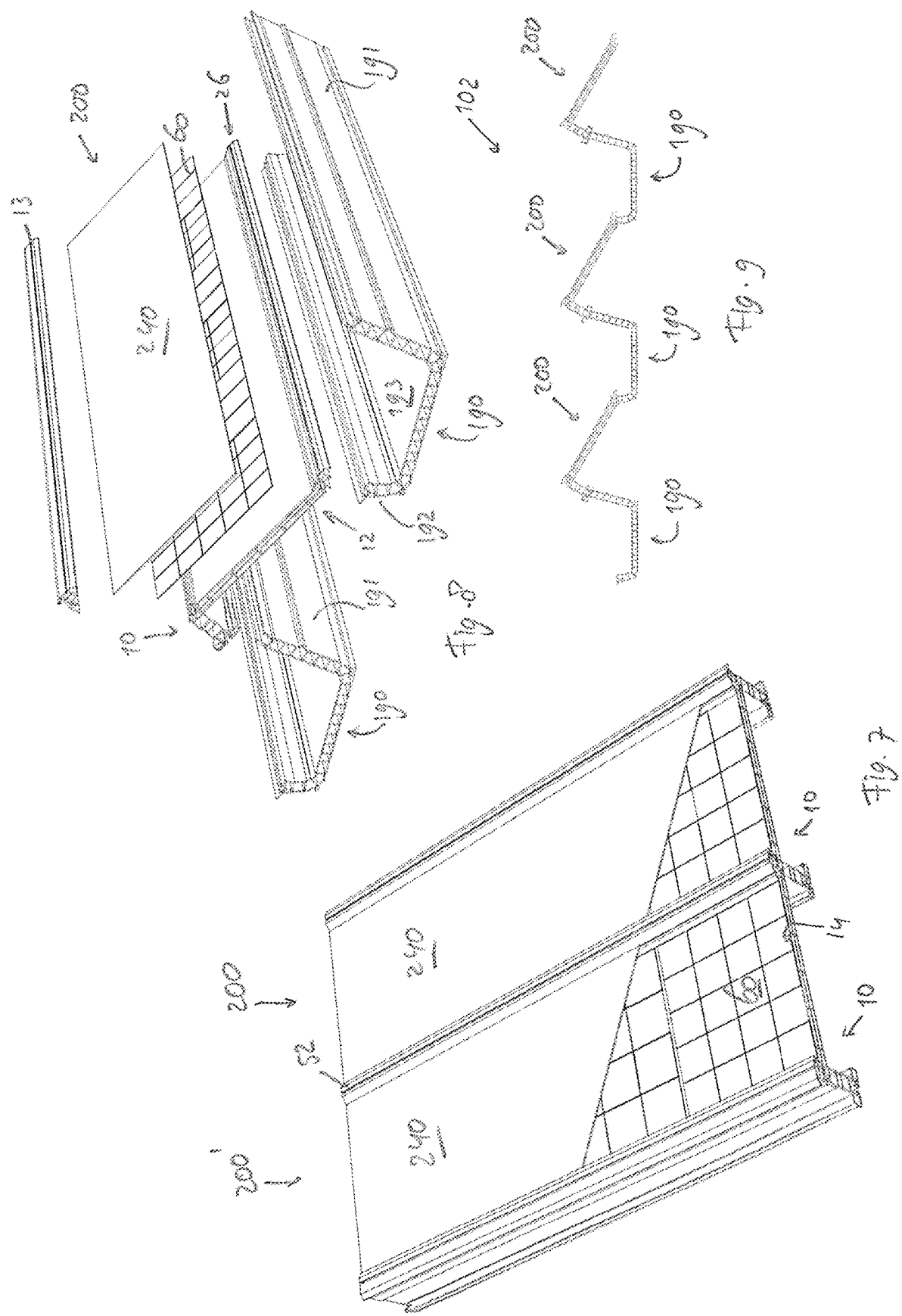

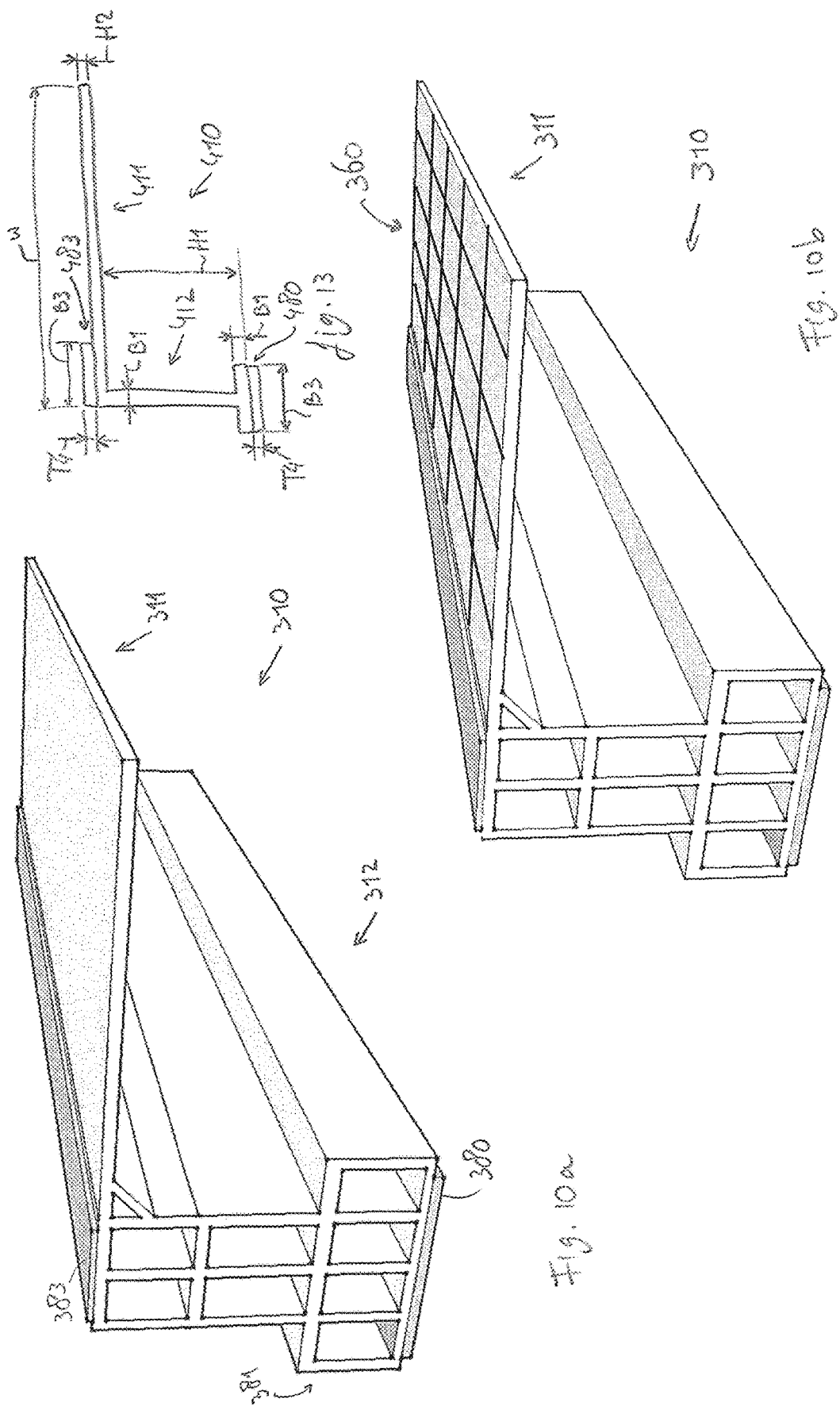

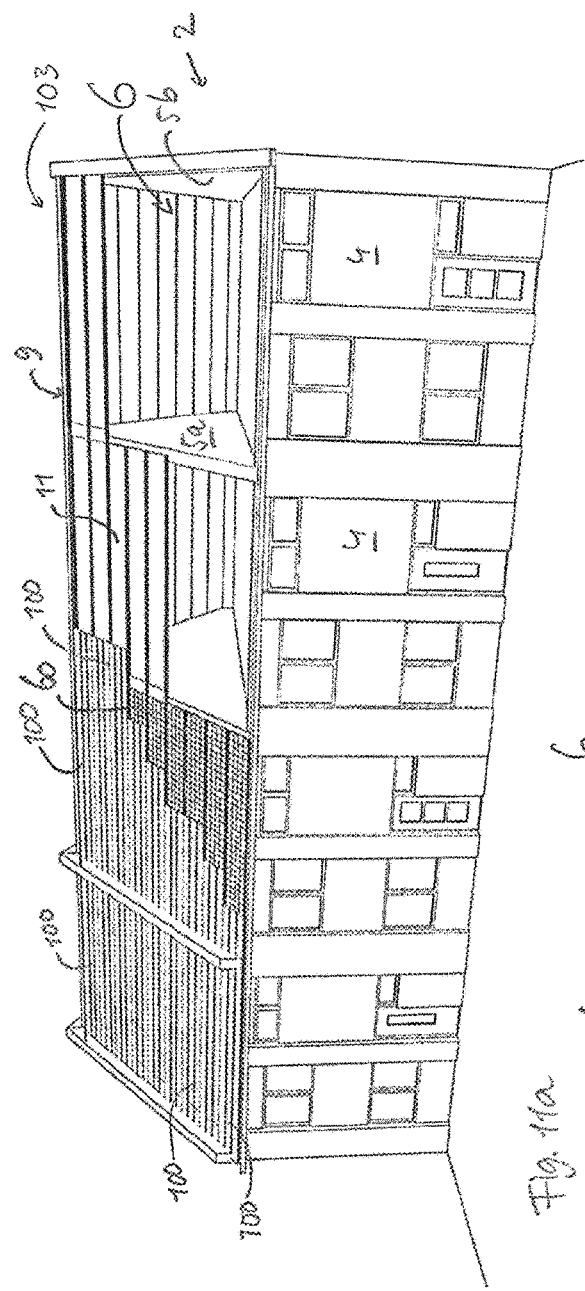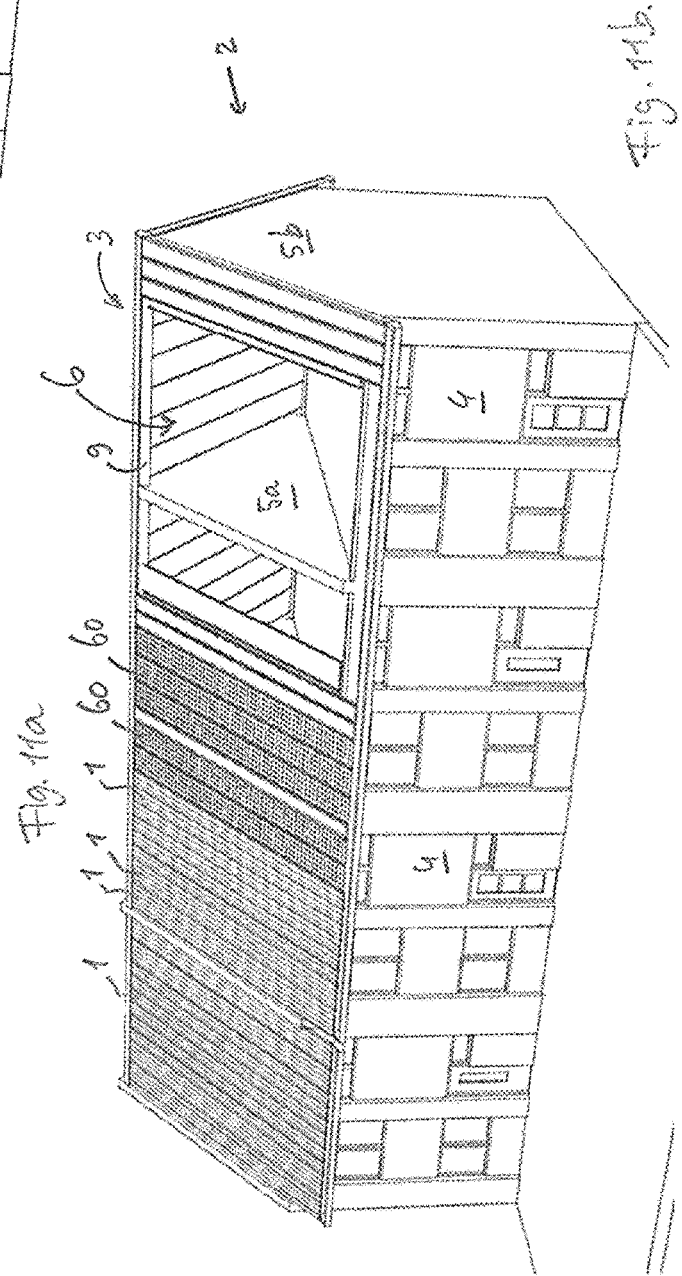

ROOF FORMING ELEMENT, ROOF, AND METHOD OF MANUFACTURING

CROSS REFERENCE TO RELATED APPLICATIONS

This application is a 371 of International Application No. PCT/EP2017/084504, filed Dec. 22, 2017, which is incorporated by reference in its entirety, and which claims priority to European Application No. 17150042.4, filed Jan. 2, 2017.

TECHNICAL FIELD

The present teachings relate to a roof and to a roof forming element a plurality of which may at least partially form the roof, which closes an opening of a building, each of said plurality of roof forming elements closing a part of said opening. Also, the invention relates to a method of manufacturing.

SUMMARY

It is an object of the invention to provide a lightweight roof forming element having a relatively high bending stiffness and which can be manufactured in a cost efficient manner. Said object of the present invention is achieved by the various aspects of the present invention.

In a first aspect, the invention relates to a roof forming element as defined in claim 1, a plurality of which may at least partially form a roof which closes an opening of a building, each of said plurality of roof forming elements closing a part of said opening. Said roof forming element comprises a base part comprising an elongate roof plate comprising a polymer, the base part having a length, defining a length direction, and a width, and having an exterior side facing the exterior of the building, and an interior side, opposite the exterior side, facing an inner space of the building, in use. The roof forming element may comprise a cover for at least substantially completely covering the exterior side of the roof plate at a distance therefrom, connected to the roof plate, so as to define an interior space of the roof forming element between the cover and the roof plate. The roof forming element also comprises coupling means for coupling the roof forming element in use to a further, neighbouring roof forming element of said plurality of roof forming elements extending in parallel to the roof forming element. The base part comprises an elongate reinforcement part comprising a strip comprising a polymer and unidirectional fibers, bonded to the base part at the interior side of the base part and extending in the length direction along the length of the base part, the elongate reinforcement part covering at least a part of, preferably only a part of the width of the base part, the strip having a higher Young's modulus than the base part, or at least the polymer of a part of the base part to which the elongate reinforcement part has been bonded.

The base part may consist of the polymer, optionally with additives such as stabilizers and/or processing aids. The base part may also comprise or consist of a composition comprising or consisting of the polymer and fillers, such as fibers, for example glass fibers, and/or additives. The composition (if used) or the polymer defines the Young's modulus of the base part. The elongate base part may comprise at least 60 wt. % or at least 70 wt. %, preferably at least 90 wt. % or even 95 wt. % or 100 wt. % of said composition (if used) or of said polymer, in other words may consist of said composition or said polymer, optionally with additives. The composition of the strip comprises or consists of the polymer and the unidirectional fibers. Said composition of the strip defines the Young's modulus of the strip.

The roof forming element according to the present teachings may have a relatively high bending stiffness, or, resistance to bending, due to the presence of the elongate reinforcement part comprising the polymer and unidirectional fibers bonded to the base part, wherein the polymer, or the composition comprising the polymer, of the base part may be low cost, since the strip contributes to the resistance to bending to a large extent. The base part of the roof forming element according to the present teachings may have been formed in a very simple and cost efficient manner by means of the extrusion process. Also, dependent on requirements, the roof forming element may be provided with for example a photovoltaic element within the interior space thereof. The cover may be configured such that an aesthetically pleasing outer view is achieved, for example resembling the shape of tiles or having a desired colour. The cover may in an embodiment have been extruded optionally in combination with vacuum forming. Alternatively it may be moulded, preferably injection moulded. Also, the roof forming element according to the present invention may be effectively recycled, it may be made such that it is not sensitive to rot and/or rust and/or mold growth, it may have a longer life-time, it may be made in any feasible dimension, it may be made such that it is not hygroscopic, i.e. it does not attract water.

An effect of the strip of the elongate reinforcement part having a higher Young's modulus, or, E-modulus, than the base part is that in use under a bending load, the strain of the base part at its interior side, at which the elongate reinforcement part is provided, is reduced.

A roof forming element according to the present teachings may be formed in a simple and cost efficient manner by means of the lamination process wherein the elongate reinforcement part has been laminated onto the base part, that means onto an outer surface of the base part at the interior side of the base part, optionally using a tie layer in order to safeguard to a large extent that the reinforcement part adheres to the base part. The skilled person knows which tie layers are suitable, e.g. adhesion of polycarbonate to polypropylene can be performed for example with a polyethylene or polypropylene grafted with maleic acid.

In the present description and claims, by "strip comprising a polymer and unidirectional fibers" is meant a strip comprising a polymer reinforced with fibers oriented in substantially one direction. For the purpose of the present invention, the fibers are oriented in substantially the length direction. Such a strip may for example be produced by impregnating a continuous fiber strand with polymer, for example as described in WO 2016/142784. The strip may have a relatively small amount of fibers oriented in a direction other than the longitudinal direction, such as in transverse, or, width direction of the strip.

The amount of fibers in the strip may vary along wide ranges, for example between 35 and 85 volume %, preferably between 50 to 75 volume %, preferably 55 to 70%, based on the total of the polymer and the fibers.

For the purpose of the invention, with "transparent to light" is meant transparent to light to such an extent that in use of the photovoltaic packaging electrical power is generated by the plurality of photovoltaic cells due to incident sunlight. For the purpose of the invention, with transparent to light is meant that the polymer front layer allows at least an average of 65%, preferably at least an average of 70%, more preferably at least an average of 75%, most preferably at least an average of 80% transmission of light in the wavelength range of 350 nm to 1200 nm as compared to a situation without the polymer front layer, when measuring the transmittance curves (full spectrum from 200-2500 nm) using a Perkin Elmer Lambda 950 according to ASTM D1003 (used lamp: halogen in combination with deuterium lamp). That means that the transmission of light is measured according to ASTM D1003.

In the present description and claims, by "the strip extending along the length of the base part" is meant that the strip extends, continuously, along at least substantially the length of the base part, preferably along at least 75% of said length, further preferably along at least 90% of said length.

In an embodiment, the roof forming element has such an elongate reinforcement part bonded to the base part at two opposite sides, that means, outer surfaces, of the base part. Thus, in an embodiment the roof forming element comprises a further elongate reinforcement part comprising a further strip comprising a polymer and unidirectional fibers, bonded to the base part at the exterior side of the base part, that means onto an outer surface of the base part at the exterior side of the base part, and extending in the length direction along the length of the base part, the further elongate reinforcement part covering at least a part of, preferably only a part of the width of the base part. The further strip thus also having a higher Young's modulus than the base part. An effect is that the roof forming element has an increased bending stiffness in respect of a load in at least two opposite directions, such as by vertical downward and upward forces. In use the downward force is mainly due to the weight of the roof forming element and any objects on top of the roof forming elements, including precipitation such as snow. Upward forces are generated by wind forces on the roof.

In an embodiment, the elongate reinforcement part covers at most 30%, preferably at most 15%, of the width of the base part. The same holds for the further elongate reinforcement part.

In an embodiment the elongate reinforcement part and/or the further elongate reinforcement part comprise multiple strips comprising a polymer and unidirectional fibers bonded to each other. In that case the multiple strips form a stack of strips, bonded to the respective sides of the base part. In this case, the beam may be produced in a more convenient manner, since now each strip may be relatively thin, as the multiple strips in combination will provide the desired bending stiffness, and therefore easily be provided on a roll during production. This holds in particular for strips having a thickness of less than 1 mm.

The elongate reinforcement part may have been bonded to the polymer base part while forming the base part by means of extrusion (or melting). The same holds for the further elongate reinforcement part. This way, a roof forming element according to the invention is produced in a highly efficient manner having a strong bond between the base part and the elongate reinforcement part and optionally the further elongated reinforcement part.

In an example, the Young's Modulus of the base part is in the range of 1000-15000 N/mm$^2$. The ratio of the Young's Modulus of the strip versus the Young's Modulus of the base part is, in an example, in the range of 2:1 to 40:1, or, in an example, 3:1 to 20:1.

The strip comprising a polymer and unidirectional fibers may have a thickness in the range of 0.1-5 mm, preferably 0.2-2.5 mm.

The polymer of the base part and/or the polymer of the strip may be chosen from the group consisting of thermoplastic polymers, including co-polymers, or blends thereof.

Non-limiting examples of thermoplastic polymers include polyethylene terephthalate (PET), polycarbonates (PC), polybutylene terephthalate (PBT), poly(1,4-cyclohexylidene cyclohexane-1,4-dicarboxylate) (PCCD), glycol modified polycyclohexyl terephthalate (PCTG), poly(phenylene oxide) (PPO), polypropylene (PP), polyethylene (PE), polyvinyl chloride (PVC), polystyrene (PS), polymethyl methacrylate (PMMA), polyethyleneimine or polyetherimide (PEI) or derivatives thereof, thermoplastic elastomers (TPE), terephthalic acid (TPA) elastomers, poly(cyclohexanedimethylene terephthalate) (PCT), polyethylene naphthalate (PEN), polyamides (PA), polysulfone sulfonate (PSS), polyether ether ketone (PEEK), polyether ketone ketone (PEKK), acrylonitrile butyldiene styrene (ABS), polyphenylene sulfide (PPS), co-polymers thereof, or blends thereof.

More preferred thermoplastic polymers include polypropylene, polyamides, polyethylene terephthalate, polycarbonates (PC), polybutylene terephthalate, poly(phenylene oxide) (PPO), polyetherimide, polyethylene, co-polymers thereof, or blends thereof. Even more preferred thermoplastic polymers include polypropylene, polyethylene, polyamides, polycarbonates (PC), co-polymers thereof, or blends thereof.

Examples of polypropylene include but are not limited to homopolymers of propylene, random copolymers of propylene with a C2 or C4 to C10 alpha olefin comonomer, for example ethylene; and heterophasic propylene copolymers comprising a matrix of propylene homopolymer and/or random copolymers of propylene and a dispersed propylene-alpha-olefin rubber phase, wherein the alpha-olefin may be chosen from the list consisting of C2 and C4 to C10 alpha olefin comonomers (multiple comonomers possible).

Examples of polyethylene include but are not limited to linear low density polyethylene (LLDPE), low density polyethylene (LDPE), high density polyethylene (HDPE), preferably HDPE.

The base part may comprise a composition comprising the polymer and fillers and/or additives. The strip comprising the polymer and unidirectional fibers may comprise additional fillers and/or additives, in addition to the fibers. Examples of (additional) fillers include but are not limited to: steel fibers/whiskers/flakes, glass fibers, talc, carbon black, carbon fibers, nanocomposites/nanofibers.

Non-limiting examples of additional additives include coupling agents to promote adhesion between the polymeric matrix and continuous fibers, antioxidants, heat stabilizers, flow modifiers, flame retardants, UV stabilizers, UV absorbers, impact modifiers, colorants, or a combination thereof.

The base part may have been foamed, hollow or solid. If foamed, the foam part may have been coextruded with the remainder of the base part.

For the purpose of manufacturing the base part and elongate reinforcement part of the roof forming element, a polymer composition, of an above mentioned polymer, and further comprising additives such as for example for fire resistance, UV protection, color, durability, may be provided.

Examples of suitable strips comprising a polymer and unidirectional fibers, of the elongate reinforcement part, are constituted by unidirectional (UD) fiber-reinforced composites as disclosed in WO 2016/142784, for example in paragraph [0010], which disclosure is incorporated by reference.

Such a fiber-reinforced composite as is known from WO 2016/142784 comprises:

a matrix material including a thermoplastic material; and a non-woven fibrous region comprising a plurality of continuous fibers dispersed in the matrix material;

wherein the width and the length of the non-woven fibrous region are substantially equal to the width and the length, respectively, of the fiber-reinforced composite;

wherein the non-woven fibrous region has a mean relative fiber area coverage (RFAC) (%) of from 65 to 90 and a coefficient of variance (COV) (%) of from 3 to 20; and wherein each of the plurality of continuous fibers is substantially aligned with the length of the fiber-reinforced composite.

In case that the polymer in the base part and in the strip are the same, the beam may be recycled in a more efficient manner, at the end of its life cycle.

In an embodiment, the polymer roof plate of the base part has a top plate at its exterior side and a bottom plate at its interior side, which top plate and bottom plate are interconnected via a plurality of ribs extending along the length of the roof plate, the top plate and the bottom plate and the plurality of ribs preferably being integral, preferably being made by extrusion.

The roof forming element may further comprise a beam, wherein the beam extends in the length direction of the roof plate, located at a first longitudinal side of the roof plate, and protrudes from the interior side of the roof plate, wherein the other, second longitudinal side is free from such a beam protruding from the interior side of the roof plate, such that a combination of the roof plate and the beam has an L-shaped cross-section. The roof forming element, at least in a mounted condition of a plurality of such roof forming elements forming the roof, may be configured such that the second longitudinal side of the roof forming element is arranged to be supported by the first longitudinal side of a further, neighbouring one of said plurality of roof forming elements, so that the beam of the further roof forming element also supports the roof plate of the roof forming element, and so that the respective roof plates of said roof forming element and further roof forming element are at least substantially flush with respect to each other. An advantage of the roof forming element according to the present invention having the beam and roof plate is that because of the L-shape thereof, a roof can be formed in a very efficient manner using a plurality of such elements. The beam of a first one of said elements also supports a second one of said elements, at least in case of directly adjacent elements.

The beam preferably comprises, or consists of a polymer, the polymer preferably being the same as the polymer in the base part and/or in the strip. Thus, the polymer of the beam is preferably chosen from the above mentioned group consisting of thermoplastic polymers, including co-polymers, or blends thereof, as detailed above. The beam may consist of the polymer, optionally with additives such as stabilizers and/or processing aids. The beam may also comprise or consist of a composition comprising or consisting of the polymer and fillers, such as fibers, for example glass fibers, and/or additives. The beam may comprise at least 60 wt. % or at least 70 wt. %, preferably at least 90 wt. % or even 95 wt. % or 100 wt. % of said composition (if used) or of said polymer, in other words may consist of said composition or said polymer, optionally with additives.

In an embodiment the beam is integral with the roof plate, preferably made by extrusion. An integral combination of the beam and the roof plate forming the base part provides bending and torsion stiffness to the roof forming element. As a result, the roof forming elements may extend over the entire building opening covered by the roof, i.e. they may have a substantial length. Thus, a roof forming element according to the present embodiment provides in one and the same element a building closure as well as a constructional provision. The roof forming elements according to the present embodiment are highly cost-efficient since the roof plate and the beam have been manufactured as an integral component, and have preferably been extruded. Due to the use of a polymer for the integral combination of the roof plate and the beam, and highly preferable also for the cover, the roof forming element can be manufactured very cost efficient. Using a plurality of roof forming elements according to the invention, a roof can be easily and quickly formed.

The ratio between the height of the beam and the width of roof plate may be in the range of 1:15 to 1:1, preferably 1:10 to 1:2, more preferably 1:8 to 1:2.5.

The elongate reinforcement part may have been bonded to a free, lower surface of the beam facing away from the roof plate. The further elongate reinforcement part may have been bonded to an upper surface of the beam, or at least to the base part at the exterior side, at the same transverse location as the elongate reinforcement part. That means that the elongate and the further elongate reinforcement parts are above each other.

In an embodiment the coupling means are configured for a coupling, preferably a form-closed coupling, of the second longitudinal side of the roof forming element to a first longitudinal side of the further, neighbouring one of the plurality of roof forming elements.

In an embodiment the roof forming element comprises a photovoltaic element in its interior space, wherein the cover is transparent to light. In an embodiment, the photovoltaic element covers at least substantially the entire exterior side of the roof plate.

In an embodiment, the photovoltaic element is a solar module, i.e. a packaged, connected assembly of solar cells being fully covered with an encapsulation layer. In another embodiment the photovoltaic element is foil-like, placed in the interior space. In an embodiment the photovoltaic element is exchangeably disposed in the interior space.

Corresponding embodiments are also applicable for method and building according to the present teachings, as detailed below, and vice versa.

In a further aspect the invention relates to a method of manufacturing a base part of a roof forming element according to the present invention, comprising
  feeding a composition comprising a polymer, for forming the base part, via an extruder, to an extrusion die,
  feeding an elongate reinforcement part comprising a strip comprising a polymer and unidirectional fibers to the extrusion die,
  forming the base part by extrusion, while bonding the elongate reinforcement part to the base part by joining the elongate reinforcement part and the composition within the extrusion die.

In a still further aspect, the invention relates to a building, having a roof closing an opening of the building, wherein the roof has at least partly been formed by a plurality of roof forming elements according to the present invention, each of said plurality of roof forming elements closing a part of said opening, wherein the plurality of roof forming elements are supported by a support structure of the building, which support structure surrounds the opening.

The length of each of the plurality of roof forming elements may be about equal to a length of the roof, the plurality of roof forming elements being interconnected such that they close the entire opening in the building.

The building may comprise in the interior space of at least one of the plurality of roof forming elements a photovoltaic element, wherein the cover of that at least one roof forming element is transparent to light.

The base part may have a rib at a first longitudinal side of the roof plate, on the exterior side of the base part, and may have a flange element at the second longitudinal side of the base part, which is arranged to overlap a rib of a further, neighbouring roof forming element connected to the roof forming element.

The roof plate may comprise an intermediate plate between the top plate and the bottom plate, wherein the intermediate plate is integrally interconnected to the top plate as well as to the bottom plate via a plurality of ribs extending in length direction of the roof plate.

The cover may seal the interior space from the outside at the longitudinal sides of the roof forming element, wherein the roof forming element comprises a respective closing element at both its end faces seen in the length direction, extending between the roof plate and the cover, for sealing the interior space of the roof forming element at the respective end face.

The roof of the building may further comprise a plurality of ceiling plates, wherein each of the ceiling plates has been connected to a free end of the beam of at least two neighbouring roof forming elements, so as to form a ceiling for the inner space of the building underneath the roof.

Each of the plurality of roof forming elements may have a length which is about equal to a length of the roof and each have a width which is a part of a width of the roof, wherein the plurality of roof forming elements are interconnected, wherein the roof also comprises a further roof forming element having the roof plate and the cover but is free from a beam at its first longitudinal side, which further roof forming element is interconnected to one of the outer ones of the interconnected roof forming elements at the first longitudinal side of that outer roof forming element, wherein the opening is closed entirely by the further roof forming element and the plurality of roof forming elements.

The roof of the building may be a pitched roof, wherein the opening closed by the roof is bounded by a ridge and a building wall, which define a length of the roof, and by further opposite building walls, which define a width of the roof.

BRIEF DESCRIPTION OF DRAWINGS

The present teachings are described hereinafter with reference to the accompanying schematic drawings in which examples of the invention are shown and in which like reference numbers indicate the same or similar elements.

FIG. 1 shows in three-dimensional, exploded view a first embodiment of a roof forming element according to the invention, FIG. 2 shows in three-dimensional view a part of two roof forming elements according to FIG. 1, in interconnected condition, FIG. 3 shows a front view of a part of the roof forming element according to FIG. 1, FIG. 4 shows a front view of parts of the two roof forming elements in interconnected condition according to FIG. 2, FIG. 5 shows a front view of a part of a further embodiment of a roof forming element according to the present invention, FIG. 6a shows in three-dimensional view a part of a second embodiment of a roof forming element according to the invention, FIG. 6b shows in three-dimensional view a part of two roof forming elements according to FIG. 6a, in interconnected condition, FIG. 7 shows in three-dimensional view a part of two roof forming elements according to a third embodiment of the invention, in interconnected condition, FIG. 8 shows in three-dimensional, exploded view a part of a first embodiment of a roof according to the invention, comprising roof forming elements according to the third embodiment as shown in FIG. 7, FIG. 9 shows a cross section of a part of the first embodiment of the roof according to the invention, FIG. 10a shows in three-dimensional view a part of a fourth embodiment of a roof forming element according to the present invention, FIG. 10b shows the part of FIG. 10a in combination with a photovoltaic element, FIG. 11a shows in three-dimensional view a second embodiment of a roof according to the invention, comprising roof forming elements according to the second embodiment, FIG. 11b shows in three-dimensional view a third embodiment of a roof according to the invention, comprising roof forming elements according to the first embodiment.

Figure 12A:
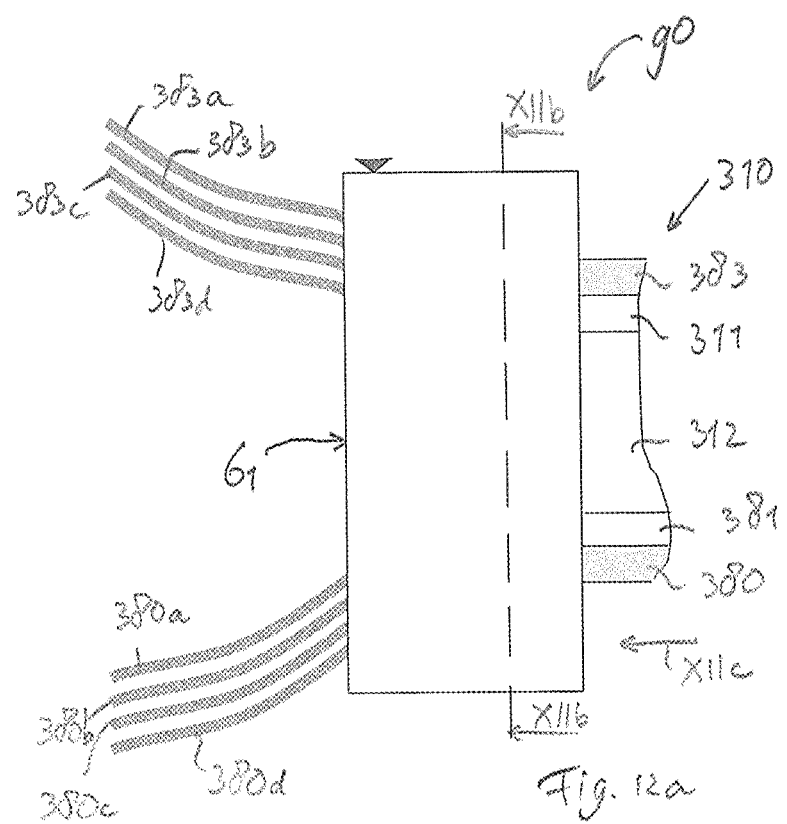
FIG. 12a shows, in side view, an example of an extrusion die, shown highly simplified for the purpose of explaining the manufacturing process according to the invention.

Throughout the figures, components which are equal, or at least function in a similar manner, have been indicated with the reference signs to which each time 100 is added. The figures are not to scale as to the thickness of any reinforcement parts (to be explained in detail below) relative to a height dimension of other components of roof forming elements.

DESCRIPTION OF EMBODIMENTS

FIG. 1 shows a roof forming element 1 in exploded view. FIG. 5 shows a roof forming element 100. The roof forming elements 1, 100 and also other embodiments of roof forming elements described in the remainder of this description, are intended to be used for forming a roof of a building with a plurality of such elements. Said plurality of roof forming elements close an opening of the building of which the roof forms part. See FIGS. 11a and 11b for examples of roofs 3, 103 according to the invention, during the construction process of the roof. For clearly showing the construction of the building and the roof, some roof forming elements or parts thereof are not shown.

On the left side of FIGS. 11a, 11b a completed roof according to the invention, of a further building, is shown. The opening 6 of a building 2, at least in the examples of FIGS. 11a and 11b, is defined by a front wall 4 and a ridge beam 9, and by two opposite side walls 5a and 5b. The roof 3, 103 is a pitched roof, extending from the front wall 4, or at least from a lower extremity, to a ridge 9, or at least a higher extremity, being supported by said walls 5a, 5b forming a support structure for the roof 3, 103. The opening 6 is free from any support elements such as rafters and purlins. In an embodiment, the opening may have one or more purlins, for the purpose of forming a connection between the side walls.

If in the below description a number is given the addition ' this is only done for the purpose of a clear description of the invention as to the mutual connection of parts. The parts, for example 100, 100', are actually identical to each other.

Each of the roof forming elements comprises an elongate integral extruded base part 10 comprising a roof plate 11 and a beam 12. In another embodiment the roof plate 11 and the beam 12 may have been provided as separate components, wherein the beam 12 may have been provided as part of a roof support of the building, such as forming a rafter extending between the mentioned lower extremity, in the building 2 formed by the front wall 4, and the ridge beam 9. The base part 10 comprises polypropylene filled with 20 wt. % glass fiber and has been made by extrusion. The roof plate 11 has a top plate 14 and a bottom plate 16 parallel to the top plate 14. See also FIG. 3. The roof plate 11 further has an intermediate plate 20 between the top plate 14 and the bottom plate 16, wherein the intermediate plate 20 is integrally interconnected to the top plate 14 as well as to the bottom plate 16 via a plurality of ribs 21 and 22 respectively, extending in length direction 8, i.e. extrusion direction of the roof plate 11.

The roof plate 11 defines a length l, in the length direction 8, and width w of the roof forming element 1, the roof plate having an exterior side, i.e. the side of the top plate 14, facing the exterior of the building in use, and an interior side, i.e. the side of the bottom plate 16, opposite the exterior side, facing an inner space of the building, in use.

The beam 12 extends in the length direction of the roof plate 11 and is located at a first longitudinal side 24 of the roof plate 11. It protrudes downwards from the bottom plate 16 of the roof plate, having a height h of 15 cm, at least in the present example. The width w of the roof plate 11, and thus of the base part 10, is 70 cm, at least in the present example. The ratio of height h:width w depends on the requirements of a specific roof to be formed using said roof forming element 1.

A second longitudinal side 26 of the roof plate 11 is free from such a beam protruding downwards from the bottom plate. As shown in FIGS. 1 and 3 in particular, the base part 10 having the roof plate 11 and the beam 12 has an L-shaped cross-section. The roof forming element has a length l. This length may be chosen in dependence of the relevant dimension of a building opening to be spanned.

The first longitudinal side 24 is provided with a groove 30 facing upwards, in the length direction. The second longitudinal side 26 has a rib 32 facing downwards, also in the length direction. The groove 30 and rib 32 are configured such that the rib 32 of a further roof forming element 1', being the same as the roof forming element 1, can be received in the groove 30 of the roof forming element 1, such that the roof forming element 1 supports said further element 1' at that location. See FIG. 4. This means that the beam 12 of the roof forming element 1 also supports the roof plate of said further roof forming element 1'. The roof forming element 1, more specifically said rib 32 and groove 30, is configured such that in coupled condition to a further, neighbouring roof forming element as described, the respective roof plates of said roof forming element 1 and said further roof forming elements are flush with respect to each other. See FIG. 4. Said groove 30 and rib 32 are part of coupling means for coupling the roof forming element to a further, neighbouring roof forming element.

The base part 10 of the roof forming element 1 has an elongate reinforcement part comprising a polymer and unidirectional fibers, the elongate reinforcement part comprising two strips 80 comprising a polymer and unidirectional fibers, bonded to the base part 10 at the interior side of the base part and extending in the length direction along the length l of the base part. The strips 80, and further embodiments of strips described below, are made of glass filled polypropylene, having a glass fiber content for example in the range of 35 to 85 volume %. The strips 80 comprising a polymer and unidirectional fibers forming the elongate reinforcement part extend in the length direction along the entire length of the base part 10. The elongate reinforcement part having the strips 80 covers only a part of the width w of the base part 10. More specifically the strips 80 are bonded to a free, lower end 81 of the beam 12 facing away from the roof plate 11. Said lower end 81 is widened so as to create more room for the strips 80.

The central groove 82 at the end 81 may be used for connecting further structural parts such as ceilings plates to the roof forming element 1. On both sides of the groove 82 a respective strip 80 is provided. The presence of the elongate reinforcement part in the form of the strips 80 on the lower end of the beam 12 of the base part 10 increases the bending stiffness of the base part 10 when loaded with a vertical downward force, or at least with a force directed from the exterior to the interior side.

The roof forming element also comprises a further elongate reinforcement part comprising a further strip 83 comprising a polymer and unidirectional fibers, bonded to the base part 10 at the exterior side of the base part and extending in the length direction along the length of the base part, the further elongate reinforcement part covering only a part of the width of the base part. More specifically the further strip 83 is bonded to an upper end surface of the beam 12.

At least in the present example the strips 80 and 83 each have a thickness of 1 mm, that means in the direction of the height of the beam 1. They are made of the same mentioned polymer. Instead of a single strip 80 or 83, multiple strips may be provided, that means a stack of strips, such as formed by two or three or four or more than four strips, to form the elongate and/or the further elongate reinforcement part. The strips forming part of a stack may have a thickness of 1 mm, for example, or more or less, such as 0.25 mm per strip.

In another embodiment, only one strip may have been provided at the lower end 81, in which case the lower end 81 may not have a mentioned groove 82 but instead a closed lower end surface to which a strip may be bonded. Such an embodiment is shown in FIG. 5. FIG. 5 shows a base part 110 which is the same as base part 10 except for the lower end 181 of the beam 112. The base part also has a roof plate 111 and a further elongate reinforcement part 183 which is the same as further reinforcement part 83 of base part 10. The lower end 181 has an elongate reinforcement part comprising a polymer and unidirectional fibers, like strip 80, the elongate reinforcement part comprising one strip 180 comprising a polymer and unidirectional fibers, bonded to the base part 110 at the interior side of the base part. The above mentioned elongate reinforcement parts 80, 83, 180, 183 have been bonded to the respective polymer base parts 10, 110 while forming the base part by means of extrusion.

The roof forming element 1 also has a cover 40 for at least substantially completely covering the exterior side, i.e. the top plate 14 at a distance therefrom, so as to define an interior space 44 between the cover 40 and the top plate 14 closed from external influences. The cover 40 extends over the entire width of the roof plate 11 and over the length l of the roof plate 11. The cover 40 is corrugated and closes the interior space 44. The cover 40 protects the interior space 44 from external influences, such as precipitation, at the longitudinal sides of the roof forming element 1, wherein the roof forming element 1 may comprise a closing element (not shown) at both its end faces seen in the length direction, extending between the roof plate and the cover, for sealing the interior space of the roof forming element at the respective end face. The top end face of the roof forming element, at least when used for forming a pitched roof, may also be closed by a ridge beam functioning as closing element.

The cover has a wall portion 46 at a first longitudinal side 47. The wall portion 46 is received in a groove 49 at the second longitudinal side 26 of the roof forming element 1' disposed left from the element 1, see FIG. 4. Alternatively, the wall portion 46 may be received in a groove of an end piece 13 in case element 1 is the most left element in a row of such elements, see FIGS. 1 and 2. The end piece does not form part of the roof forming element as shown in FIG. 1. The same holds for the end beam 17 as discussed below and the end piece 15 as discussed below. In coupled, i.e. interconnected condition of two or more roof forming elements 1, as shown in FIGS. 2 and 4, the wall portion 46 of the cover 40 of a first one 1' of the roof forming elements supports the second longitudinal side 48 of the cover 40 of a further, neighbouring one 1 of the roof forming elements 1, 1' (roof forming elements 1, 1' only shown in part in FIG. 4 and a cover 40 of the element 1' only shown partly). Said second longitudinal side 48 overlaps the first longitudinal side 47 of the neighbouring cover 40. This way, a connection between said two adjacent elements 1, 1' is not only provided by the above described groove 30 and rib 32 but also by the wall 46 and side 48 of covers 40 of the adjacent elements 1, 1'.

In order to clarify the invention, FIG. 4 also shows an end piece 15 at the second longitudinal side 26 of the most right element 1 in a row of such elements. The end piece 15 supports the second longitudinal side 48 of the cover of element 1. FIG. 2 also shows an end beam 17, supporting the second longitudinal side of the element 1.

The roof plate 11 of the roof forming element 1 has a rib 50 at the first longitudinal side 24 of the roof plate 11, on top of the top plate 14. The roof plate also has a flange element 52 at the second longitudinal side of the roof plate 11, which is arranged to overlap, or, hook over, the rib 50 of a further, neighbouring roof forming element coupled to the roof forming element 1.

In an embodiment, the integral combination of the roof plate 11 and the beam 12 forming the base part 10 is at least substantially made of glass fibre reinforced polypropylene, preferably polypropylene reinforced with long glass fibers (PP-LGF). In an embodiment, the base part may only have the roof plate 11, that means not the beam 12, while a beam may in that case be separately provided. In an embodiment of the base part, it comprises both the roof plate and the beam, mutually fixated using fixating means such as glue or mutually fixated by means of welding.

The roof forming element 1 also comprises a photovoltaic element 60 in its interior space 44. The photovoltaic element 60 is a solar module, i.e. a packaged, connected assembly of solar cells being fully covered with an encapsulation layer. It comprises a grid of interconnected photovoltaic cells. The cover 40 is transparent to light such that in use electrical power can be generated by the photovoltaic element 60 due to incident sunlight. The photovoltaic element 60 covers about the entire surface of the roof plate 11. Alternatively, part of said surface may be covered with a photovoltaic element. When in use, some or all of the plurality of roof forming elements forming the roof may not be equipped with a photovoltaic element. The amount of photovoltaic elements in the plurality of roof forming elements may be chosen based on for example the desired total combined amount of electrical energy to be generated by the photovoltaic elements.

The roof forming elements 1 are configured to extend in one piece from a first, such as the lower, or left, extremity to a second, such as the higher, or right, extremity of an opening of the building in the absence of any other support structure in the opening. The beams 12 provide the required bending stiffness of the roof forming elements 1. The plurality of roof forming elements 1 are coupled to each other. The roof also comprises an additional roof element having the roof plate and the cover but being free from a beam at its first longitudinal side, which additional roof element is coupled to one of the outer ones of the mutually coupled roof forming elements at the first longitudinal side of that outer roof forming element, wherein the opening is closed entirely by the additional roof element and the plurality of roof forming elements.

A roof formed from a plurality of elements 1 may comprise a plurality of ceiling plates each covering the space between two neighbouring beams 12 of two respective neighbouring roof forming elements 1, being connected to a free end of said beams, preferably by means of a snap/lock connection. The ceiling plates may also be extruded, at least in the present example. As a result, a ceiling is formed for an inner space of the building underneath the roof. Optionally, insulation material 89 (not shown in FIGS. 3 and 4) may be provided in the space underneath the roof plate 11 and two neighbouring beams 12.

In the example according to FIG. 11b, showing a roof 3 during assembly, the opening 6 is closed by a plurality of interconnected roof forming elements 1 each extending in vertical direction and spanning the opening 6 between the front wall 4, or at least the gutter, and the ridge 9. The elements 1 are partly shown.

FIG. 6a shows a roof forming element 100 as an alternative embodiment of a roof forming element according to the invention. The roof forming element 100 is identical to the roof forming element 1, except for the cover 140 and for the end piece 115. Roof forming element 100 has a cover 140 also having a roof tile pattern, but now in width direction of the roof forming element 100. This means that a plurality of such elements 100 are to be provided in the building opening such that they extend in a horizontal direction. Two of such roof forming elements, in a mutually connected state, are shown in FIG. 6b. The end piece 115 is designed to follow the interior contour of the cover 140. In the example according to FIG. 11a, showing a roof 103, the opening 6 is closed by a plurality of interconnected roof forming elements 100 each extending in horizontal direction and spanning the opening 6 between the side walls 5a, 5b.

FIG. 7 shows two roof forming elements 200, 200', interconnected, which roof forming elements 200 are an alternative embodiment of roof forming elements according to the invention. The roof forming element 200, 200' is identical to the roof forming element 1, 100, except for the cover. Roof forming element 200, 200' has a cover 240 in the form of a glass plate being placed on top of the roof plate 11 such that it is at a distance in the range of about 1 mm. to about 5 cm. from the top plate 14. It defines an interior space 44 between the top plate 14 and the glass plate 240 in which interior space a photovoltaic element 60 is provided. At the first longitudinal side, the cover 240 is overlapped by the flange 52 element of a further, neighbouring roof forming element, as shown in FIG. 5. Optionally, the above mentioned groove 49 may be closed by a closing strip, or may be absent at all.

FIG. 8 and FIG. 9 show a part of an industrial roof 102 comprising a plurality of roof forming elements 200. The roof has a plurality of mutually identical, spaced apart support beams 190, made of a polymer such as polycarbonate. At least in the present example, the support beams are transparent to light such that daylight can pass trough the support beams to the inner space of the building. The beams 190 are extruded and have a flat bottom portion 193, a first wall part 191 at the one longitudinal side and a second wall part 192 opposite the first wall part 191 at the other longitudinal side of the bottom portion 193. The first wall part 191 is of greater height and supports the beam 12 of a roof forming element. The second wall part 192 of a neighbouring support beam 190, less high than the first wall part 191, supports that same roof forming element 200 at its second longitudinal side 26. As a result, the roof plate 11 of the roof forming element 200 is oriented under an angle with respect to the horizontal, or, with respect to the bottom plate 193 of the support beam 190. The beams 190 as well as the roof forming elements 200 preferably extend over the entire opening of the building covered by the roof 102. Of course elements 100 may be used alternatively to or in combination with elements 200.

FIG. 10a shows, very schematic, a base part 310 of a further embodiment of a roof forming element according to the present invention. The base part 310 generally corresponds to the above described base parts 10, 110. It has a beam 312 and roof plate, embodied as a single, solid plate 311. The plate 311 may have longitudinal sides like the longitudinal sides 24, 26 of base part 10, that means grooves and ribs may be provided so as to connect the base part to a cover. The beam 312 is integral with the roof plate 311, formed by extrusion. The beam 312 is a hollow profile having internal ribs like beam 12. Its lower end 381 is widened and free from a groove like groove 82. An elongate reinforcement part 380 in the form of a stack of four strips (individual strips not shown in detail) is bonded to the lower end of the beam 312. The elongate reinforcement part, except for its width and number of strips, is the same as the above mentioned reinforcement part 80. On the upper side of the beam 312, which is flush with the upper side of the roof plate 311, a further elongate reinforcement part 383 in the form of a stack of four strips is provided, bonded to the base part. FIG. 10b shows the base part 310 in combination with a photovoltaic element 360.

Figure 12B:
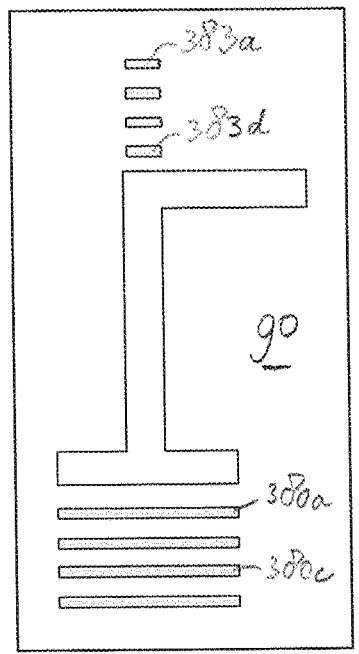
FIG. 12b shows section XIIb-XIIb of FIG. 12a, FIG. 12c shows front view XIIc-XIIc of FIG. 12a, and FIG. 13 shows a cross section a part of a fifth embodiment of a roof forming element according to the invention.
Figure 12C:
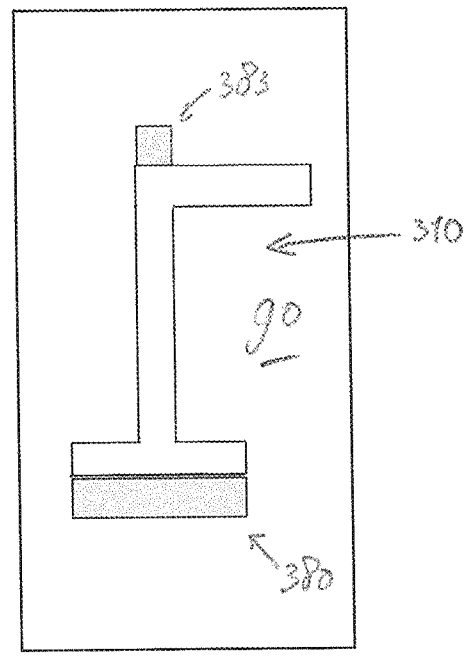

FIGS. 12a-12c show, highly simplified and without showing details such as related to the inner ribs of the beam 312, an example of an extrusion die 90 for use in a method of manufacturing of the base part 310 according to FIG. 10a. A similar process, using a similar die, adapted to the cross-sectional shape of the base part to be formed and adapted to the requirements as to the strips to be bonded to the exterior and/or interior sides of the base part to be formed, can be used for manufacturing any of the base parts discussed throughout the present description. The part of the extrusion die 90 for forming the roof plate 311 has been drawn much smaller. I.e. in order to extrude the base part 310 as shown in FIGS. 10a and 10b, the part of the extrusion die 90 for forming the roof plate 311 of said base part would be much wider. The method comprises the steps of feeding a composition, such as (melted) polymer granules, via an extruder (not shown), to the extrusion die 90, via an inlet 61. Said composition is used for forming by extrusion the base part 310. Also, in the present example, two sets of four strips 380a-d; 383a-d comprising a polymer and unidirectional fibers are fed to the extrusion die 60, each set for forming a stack of strips within the die 60, forming the elongate reinforcement part 380 and 383 respectively. Using the extrusion die 60, and the extrusion process, the base part 310 is formed while bonding the elongate reinforcement parts 380; 383, each formed in the extrusion die 90 from four strips 10, to the base part 310 during the forming of the base part 310. The composition also flows between the individual strips 380a-d; 383a-d within the die 90, so as to firmly bond the strips together, and to the base part 310. A feed speed of the strips to the die 60 is set equal to the speed of extrusion.

Examples

For the purpose of demonstrating the effect of the elongate reinforcement parts in the roof forming element according to the present invention, in an example, a calculation comparison was made between a base part, of a roof forming element according to the invention, the base part having the shape as indicated in FIG. 13 with and without reinforcement parts. In addition, the material of the base part with reinforcement parts was varied.

The base part of the roof forming element of the comparative example had the following characteristics:

| | |
|---|---|
| Width at top (w) | 800 mm. |
| Thickness of beam (B1) | 4 mm. |
| Height of beam (H1) | 296 mm. |
| Width at foot (B3) | 100 mm. |
| I (second moment of inertia) | $1.32 * 10^7$ mm$^4$ |
| density of polypropylene A | 900 kg/m$^3$ |
| density of polypropylene A filled with 30 wt % glass fiber B | 1120 kg/m$^3$ |

As reinforcement, reinforcement parts were placed on the exterior (above beam) and interior side (at lower end of beam) as indicated in FIG. 13.

The reinforcement parts had the following characteristics:

| | |
|---|---|
| Width (B3) | 100 mm. |
| Total thickness (T4) | 1 mm. |
| Material | polypropylene A, filled with unidirectional glass fibers (70 wt % glass based on the total of polypropylene A and glass fibers) density: 1670 kg/m$^3$ |
| Young's modulus of reinforcement part | 35000 N/mm$^2$ |

The bending resistance was calculated according to formula 1:

$$\text{resistance to bending} = E * I \qquad \text{(formula 1)}$$

The resistance to bending per meter is the resistance to bending divided by the height of the beam (H1). The Young's modulus was determined according to ISO527/1B (version as in force as of Jan. 1, 2016).

| | CE1 | Example 1 |
|---|---|---|
| material | polypropylene A, filled with 30 wt % glass fiber B | polypropylene A, filled with 30 wt % glass fiber B |

-continued

|  | CE1 | Example 1 |
|---|---|---|
| Reinforcement (elongate reinforcement parts 480 and 483 of FIG. 13) | no | yes |
| Thickness of beam of roof forming element (B1) (mm) | 4 | 2 |
| Weight (kg) | 5.3 | 3.0 |
| E (Young's modulus) (N/mm$^2$) of the elongate base part | 7000 | 7000 |
| Resistance to bending (per meter roof forming element) (kNm$^2$) | 369 | 375 |

As can be seen from the above Table, with the roof forming element of the invention, it is possible to achieve a similar resistance to bending at a significantly reduced weight (such as a thinner beam, for example) by using elongate reinforcement parts.

It should be clear to the person skilled in the art that with the roof forming element of the invention, at the same weight as compared to the roof forming element without elongate reinforcement parts, the resistance to bending can be increased.

The example was repeated, with the exception that the total thickness (T4) of the reinforcing element was increased to 2 mm.

|  | CE 2 | Example 2 | Example 3 |
|---|---|---|---|
| material | polypropylene A (without glass fiber B) | polypropylene A (without glass fiber B) | polypropylene A, filled with 30 wt % glass fiber B |
| Reinforcement (elongate reinforcement parts 480 and 483 of FIG. 13) | no | yes | yes |
| Thickness of beam of roof forming element (B1) (mm) | 4 | 4 | 4 |
| Weight (kg) per meter length | 4.3 | 5.0 | 6.0 |
| E (Young's modulus) (N/mm$^2$) of the elongate base part | 1450 | 1450 | 7000 |
| Resistance to bending (per meter roof forming element) (kNm$^2$) | 76 | 424 | 759 |

As can be seen from the above table, the roof forming elements of the invention have a significantly increased resistance to bending at the same dimensions. In addition, it is shown that preferably the elongate base part comprises in addition to the polymer, also reinforced fibers.

The calculations were repeated to compare the dimensions of the roof forming element of example 1 to the dimensions of a wood roof forming element having the same resistance to bending.

|  | Example 1 | CE2 |
|---|---|---|
| material |  | Atlantic white cedar |
| Density (kg/m$^3$) |  | 770 |
| E-modulus |  | 5200 |
| Width at top (W) (mm) | 800 | 800 |
| Thickness of beam of roof forming element (B1) (mm) | 2 | 4 |
| Height of beam (H1) (mm) | 296 | 296 |
| Width at foot (B3) (mm) | 100 | 100 |
| Weight (kg) per meter length | 3.0 | 3.7 |

As can be seen from the above example, traditional wooden elements may be replaced by roof forming elements of the invention while maintaining the dimensions. In addition, the roof forming elements of the invention are lighter as compared to wood enabling easier construction.

The roof forming element of the invention have the advantage that they can be prepared in any dimension, whereas with wood, additional processing steps, such as gluing or screwing need to be performed. Therefore, the dimensional tolerance of the roof forming elements of the invention is extremely high. In addition, natural variances in E-modulus in the roof forming element of the invention are almost non-existent, whereas in a wooden element variances may be present for example due to the presence of knots and other irregularities.

The invention claimed is:

1. A roof forming element, a plurality of which may at least partially form a roof which closes an opening of a building, each of said plurality of roof forming elements closing a part of said opening,
    said roof forming element comprising
        a base part comprising an elongate roof plate comprising a polymer, the base part having a length, defining a length direction, and a width, and having an exterior side, and an interior side, opposite the exterior side, facing an inner space of the building, in use,
        a cover for at least substantially covering the exterior side of the roof plate at a distance therefrom, connected to the roof plate, so as to define an interior space of the roof forming element between the cover and the roof plate, and
        coupling means for coupling the roof forming element in use to a further, neighbouring roof forming element of said plurality of roof forming elements extending in parallel to the roof forming element,
        the base part comprising an elongate reinforcement part comprising a strip comprising a polymer and unidirectional fibers, bonded to the base part at the interior side of the base part and extending in the length direction along the length of the base part, the elongate reinforcement part covering at least a part of a width of the base part,
        the strip of the elongate reinforcement part having a higher Young's modulus than the base part, or at least a part of the base part to which the elongate reinforcement part has been bonded.

2. The roof forming element according to claim 1, further comprising
    a further elongate reinforcement part comprising a further strip comprising a polymer and unidirectional fibers, bonded to the base part at the exterior side of the base part and extending in the length direction along the length of the base part, the further elongate reinforcement part covering at least a part of the width of the base part.

3. The roof forming element according to claim 2, wherein the elongate reinforcement part and/or the further elongate reinforcement part comprise multiple strips comprising a polymer and unidirectional fibers bonded to each other.

4. The roof forming element according to claim 1, the elongate reinforcement part being bonded to the polymer base part while forming the base part by means of extrusion.

5. The roof forming element according to claim 1, wherein the strip comprising a polymer and unidirectional fibers has a thickness in the range of 0.2-2.5 mm.

6. The roof forming element according to claim 1, wherein the polymer of the base part and/or of the strip is chosen from the group consisting of thermoplastic polymers, including co-polymers, or blends thereof.

7. The roof forming element according to claim 1, the base part further comprising a beam, wherein the beam extends in the length direction of the roof plate, is located at a first longitudinal side of the roof plate, and protrudes from the interior side of the roof plate, wherein the other, second longitudinal side is free from such a beam protruding from the interior side of the roof plate, such that the base part comprising the roof plate and the beam has an L-shaped cross-section,
wherein the roof forming element, at least in a mounted condition of a plurality of such roof forming elements forming the roof, is configured such that the second longitudinal side of the roof forming element is arranged to be supported by the first longitudinal side of a further, neighbouring one of said plurality of roof forming elements, so that the beam of the further roof forming element also supports the roof plate of the roof forming element, and so that the respective roof plates of said roof forming element and further roof forming element are flush with respect to each other.

8. The roof forming element according to claim 7, wherein the beam comprises a polymer.

9. The roof forming element according to claim 7, the beam being integral with the roof plate, made by extrusion.

10. The roof forming element according to claim 7, wherein the ratio between the height of the beam and the width of roof plate is in the range of 1:15 to 1:1.

11. The roof forming element according to claim 7, wherein the elongate reinforcement part is bonded to a free, lower surface of the beam facing away from the roof plate.

12. The roof forming element according to claim 1, comprising a photovoltaic element in its interior space, wherein the cover is transparent to light.

13. The roof forming element according to claim 12, wherein the photovoltaic element covers at least substantially the entire exterior side of the roof plate.

14. A method of manufacturing a base part of a roof forming element according to claim 1, comprising
feeding a composition comprising a polymer for forming at least the roof plate of the base part, via an extruder, to an extrusion die,
feeding the elongate reinforcement part comprising a strip comprising a polymer and unidirectional fibers to the extrusion die,
forming the combination by extrusion, while bonding the elongate reinforcement part to the base part by joining the elongate reinforcement part and the composition within the extrusion die.

15. A building, having a roof closing an opening of the building, wherein the roof is at least partly formed by a plurality of roof forming elements according to claim 1, each of said plurality of roof forming elements closing a part of said opening, wherein the plurality of roof forming elements are supported by a support structure of the building, which support structure surrounds the opening.

16. The roof forming element according to claim 1,
further comprising a further elongate reinforcement part comprising a further strip comprising a polymer and unidirectional fibers, bonded to the base part at the exterior side of the base part and extending in the length direction along the length of the base part, the further elongate reinforcement part covering only a part of the width of the base part;
wherein the elongate reinforcement part and/or the further elongate reinforcement part comprise multiple strips comprising a polymer and unidirectional fibers bonded to each other;
wherein the strip comprising a polymer and unidirectional fibers has a thickness in the range of 0.1-5 mm;
the base part further comprising a beam, wherein the beam extends in the length direction of the roof plate, is located at a first longitudinal side of the roof plate, and protrudes from the interior side of the roof plate, wherein the other, second longitudinal side is free from such a beam protruding from the interior side of the roof plate, such that the base part comprising the roof plate and the beam has an L-shaped cross-section;
wherein the roof forming element, at least in a mounted condition of a plurality of such roof forming elements forming the roof, is configured such that the second longitudinal side of the roof forming element is arranged to be supported by the first longitudinal side of a further, neighbouring one of said plurality of roof forming elements, so that the beam of the further roof forming element also supports the roof plate of the roof forming element, and so that the respective roof plates of said roof forming element and further roof forming element are flush with respect to each other;
wherein the ratio between the height of the beam and the width of roof plate is in the range of 1:15 to 1:1; and
wherein the elongate reinforcement part is bonded to a free, lower surface of the beam facing away from the roof plate.

17. The roof forming element according to claim 16, wherein the polymer of the base part and/or of the strip is chosen from the group consisting of thermoplastic polymers, including co-polymers, or blends thereof.

18. The roof forming element according to claim 16, wherein the beam comprises a polymer, the polymer being the same as the polymer in the base part and/or in the strip.

19. The roof forming element according to claim 7, wherein the ratio between the height of the beam and the width of roof plate is in the range of 1:8 to 1:2.5.

20. The roof forming element according to claim 12, the photovoltaic element being exchangeably disposed in the interior space.

21. The roof forming element according to claim 1, wherein a ratio of the Young's Modulus of the strip of the elongate reinforcement part to a Young's Modulus of the part of the base part to which the elongate reinforcement part has been bonded is in a range of 2:1 to 40:1.

22. The roof forming element according to claim 1, wherein the roof plate is configured to be interconnected to a roof plate of an adjacent roof forming element.

23. The roof forming element according to claim 1, wherein
a first side of the roof plate comprises a groove,
a second side of the roof plate comprises a rib, and the groove and the rib are configured such that the rib of an adjacent roof forming element can be received in the groove of the roof forming element, such that the roof forming element supports said adjacent element at that location.

* * * * *